March 1, 1960  B. E. ROBINSON  2,927,199
LAMP MOUNTING
Filed Jan. 31, 1957
2 Sheets-Sheet 1
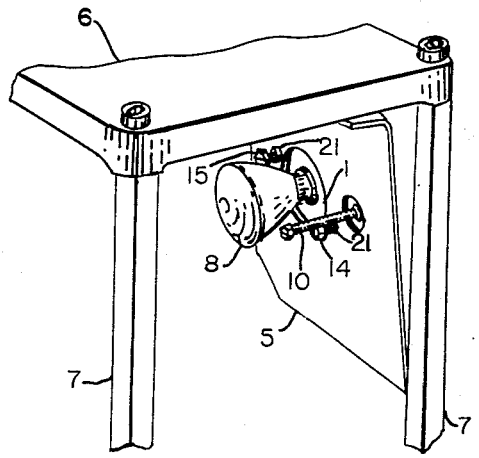
Fig. I
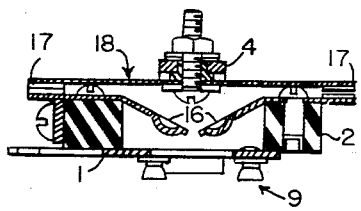
Fig. IV
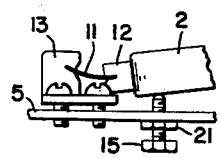
Fig. V
INVENTOR.
BRUCE E. ROBINSON
BY
Marshall, Marshall & Gerstung
ATTORNEYS March 1, 1960
B. E. ROBINSON
2,927,199
LAMP MOUNTING
Filed Jan. 31, 1957
2 Sheets-Sheet 2
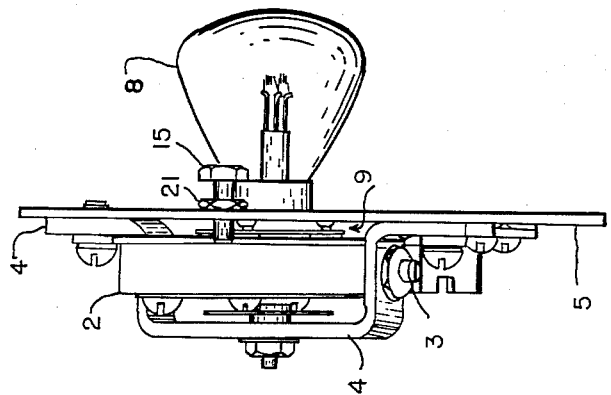
Fig. III
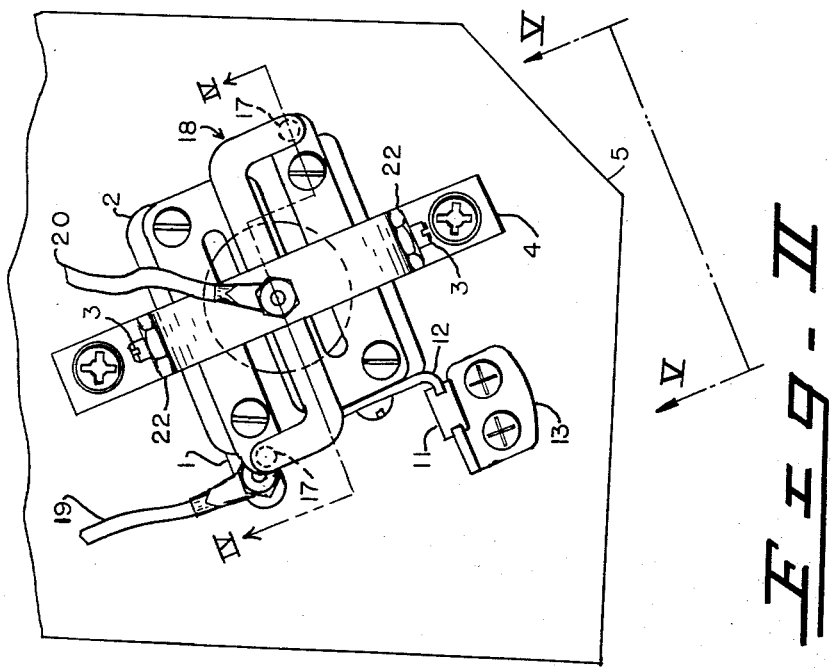
Fig. II
INVENTOR.
BRUCE E. ROBINSON
BY
Marshall, Marshall & Yeasting
ATTORNEYS United States Patent Office 2,927,199
Patented Mar. 1, 1960

2,927,199
LAMP MOUNTING

Bruce E. Robinson, Toledo, Ohio, assignor, by mesne assignments, to Toledo Scale Corporation, Toledo, Ohio, a corporation of Ohio Application January 31, 1957, Serial No. 637,513

8 Claims. (Cl. 240—37)

This invention relates to lamp mountings and in particular to improved mountings for bulbs having two filaments or a single filament in two sections.

The improved lamp mountings are especially useful in projected indication weighing scales. In the optical projection system of such a scale, it is essential that the system's light source be reliable and be located accurately relative to the other elements in the system. To insure such reliability, it is customary in projected indication weighing scales to provide a main and a reserve light source to avoid disruption of use.

Heretofore, there has been no satisfactory way, upon failure of the main light source, to accurately locate the reserve light source relative to the other elements of the optical system for optimum focus. Attempts have been made to automatically shift the reserve light source by means of an electromagnet when the main light source fails. Such systems employ non-adjustable stops to locate the reserve light source. The prior automatic shifting mechanisms are generally unsatisfactory because they employ expensive relay equipment which may be or may become noisy and because the non-adjustable locating stops do not properly position the reserve light source for optimum focus.

Other attempts have been made to provide non-automatic mechanism which is manipulated by the scale operator to change and to focus filaments. However, it has been found that inexperienced personnel often do not obtain the optimum focus with manually operated equipment. Hence, the prior automatic lamp mountings and the prior manually operated lamp mountings besides being in some instances noisy and of high cost have the common fault of being impossible or at least very difficult to focus.

It is accordingly, the principal object of this invention to provide a reliable lamp mounting for a bulb having a prefocused main and a prefocused reserve light source which may be used by inexperienced personnel, upon failure of the main source, to quickly move the reserve source into accurate alignment with the elements of an optical projection system and in which mounting the bulb may easily be replaced by such personnel, upon failure of both of the sources, to avoid significant interruption in the use of the optical system.

Other objects and advantages will be apparent from the following description, the accompanying drawings and the appended claims.

According to the invention, the improved lamp mounting includes a lamp socket which is pivotally mounted by means of an over-center toggle that may be manipulated by very lightly applied finger pressure to pivot the socket back and forth against one or the other of a pair of adjustment screws. The screws are adjusted during assembly in the factory so that in one position of the lamp socket one of the filaments of a dual filamented bulb carried by the socket is accurately aligned with the several elements of an optical projection system and so that in the other position of the lamp socket the other one of the filaments is accurately aligned with such elements, the accurately aligned one of the pair of filaments being automatically energized when it is pivoted into place to avoid interruption in the use of the optical system. Such accurate alignment of the filaments with the elements of the optical system in the factory permits the replacement of prefocused bulbs which have failed by an operator without the need for focusing by the operator who may be inexperienced in such matters. The lamp mounting is rugged, reliable, easy to operate and is of very low cost.

A preferred embodiment of the invention is illustrated in the accompanying drawings.

In the drawings:

Figure I is a perspective view of the improved lamp mounting.

Figure II is an elevational view as seen from a position at the right of the lamp mounting which is illustrated in Figure I.

Figure III is an elevational view as seen from a position at the right of the lamp mounting which is illustrated in Figure II.

Figure IV is a sectional view taken along the line IV—IV of Figure II.

Figure V is a fragmentary elevational view as seen from the line V—V of Figure II.

These specific figures and the accompanying description are intended merely to illustrate the invention and not to limit its scope.

The lamp mounting comprises a socket plate 1 that is fixedly attached to a socket block 2 which is pivoted on the axes of a pair of opposed cone-pointed screws 3 which are threaded through a bracket 4 fixedly attached to the back of a plate 5 that is hung from a shelf 6, the shelf being supported by means of posts 7. The shelf 6 and the posts 7 may be considered as part of a projected indication weighing scale frame.

The lamp mounting functions to support a prefocused bulb 8 which may be a conventional dual filamented bulb or an ordinary bulb with a single filament in two sections, the bulb being properly indexed by means of an ordinary bayonet joint 9. The bulb 8 protrudes from the socket plate 1 through an opening in the plate 5 and a stud 10 fixedly attached to the socket block 2 extends through a second opening in the plate 5 as shown in Figure I.

In addition to the two points of support for the socket block 2 provided by the cone-pointed screws 3, a third supporting point is provided by a toggle spring 11 which is held between a clip 12 on the socket block and a toggle anchor 13 fixed to the back of the plate 5. The socket block 2 may be pivoted from a first position determined by an adjustment screw 14 to a second position determined by an adjustment screw 15, which screws are threaded through the plate 5, by means of finger pressure on the stud 10. A feature of the improved mounting is that very little finger pressure need be used because the spring 11 forms an over-center toggle which as it gets past its center snaps the socket block 2 against the ends of one or the other of the adjustment screws 14 and 15.

The terminal end of the bulb 8 engages lamp contacts 16 in the lamp socket block 2. One or the other of the lamp contacts 16, depending on the position of the socket block 2, is connected to the contacts 17 of a filament switch 18 that is fixedly connected to the bracket 4 closely adjacent the back of the socket block 2 for the purpose of energizing only one of the filaments in the bulb 8 at a time, the filament switch 18 and the socket plate 1 being connected by leads 19 and 20, respectively, to a secondary of a suitably mounted ordinary transformer (not shown) which steps down voltage to a low value such that the bulb used may conveniently be an ordinary prefocused automobile headlight bulb.

The pivotal mounting of the socket block 2 provides for bringing either one or the other of the filaments of the lamp 8 into accurate alignment for focus with the several elements of an optical projection system. The filaments are prefocused during assembly in the factory by proper adjustment of the screws 14 and 15. The brilliancy and the clearness of images that are projected by the system determine the final positioning of the adjustment screws 14 and 15.

When one of the prefocused filaments in the lamp 8 fails, the operator merely manipulates the stud 10 by means of very lightly applied finger pressure to pivot the socket block 2 into its second prefocused position to bring the reserve filament automatically into accurate focus, the reserve filament being automatically energized when it is pivoted into place. Thus, failure of the main filament does not significantly disrupt the use of the optical system. In one prefocused position of the socket block 2, current flows through the closed one of the switch contacts 17 to energize one of the filaments in the bulb 8. Pivoting of the socket block 2 about the axes of the cone-pointed screws 3 into its second prefocused position breaks the circuit through such closed switch contact 17 and closes the circuit through the other one of the switch contacts 17 to energize the other one of the filaments in the bulb. The adjustment screws 14 and 15 are locked in adjusted position by nuts 21 and the cone-pointed screws 3 are locked in adjusted position by nuts 22.

When both of the filaments in the lamp 8 fail, the operator replaces the lamp with a spare in the same way that an ordinary automobile headlight bulb is replaced, i.e., by twisting the lamp to free it of the bayonet joint 9 and then by turning the spare into place. Since the lamp 8 is of the prefocused type and since the filaments are aligned with the elements of the optical system by proper adjustment of the screws 14 and 15 in the factory, the new lamp functions in the same way as the old lamp.

There is thus provided a reliable lamp mounting for a bulb having a prefocused main and a prefocused reserve light source which may be used by inexperienced personnel, upon failure of the main source, to quickly move the reserve source into accurate alignment with the elements of an optical projection system and in which mounting the bulb may easily be replaced by such personnel, upon failure of both of the sources, to avoid significant interruption in the use of the optical system.

It will, of course, be understood that various details of construction may be varied over a wide range without departing from the principles of this invention, and it is therefore not the purpose to limit the patent granted hereon otherwise than necessitated by the scope of the appended claims.

Having described the invention, I claim:

1. A lamp mounting for a single lamp having two filaments mounted within a single envelope which are substantially identical comprising, in combination, a lamp socket, means including an over-center, leaf spring toggle for so pivotally mounting the socket that movement of the socket from a first position into a second moves one of the filaments into substantially the same position and orientation previously occupied by the other filament, and stops for limiting pivotal movement of the socket between the two positions, whereby either one or the other of the filaments may be brought selectively into a focused position in an optical system.

2. A lamp mounting for a lamp of the type having at least two filaments which are substantially identical in structure and orientation comprising in combination, a lamp socket having a pair of lamp contacts one for each of the filaments, means including an over-center toggle for mounting the socket to pivot about an axis, the socket holding the lamp symmetrical relative to the axis, a stationarily mounted filament switch having a pair of switch contacts one for each of the lamp contacts, pivotal movement of the socket connecting one or the other of the lamp contacts to the switch contacts to selectively energize one of the filaments at a time, and stops for so limiting pivotal movement of the socket between two positions that movement of the socket from one of said positions into the other moves one of the filaments into substantially the same position and orientation previously occupied by the other filament, whereby either one or the other of the filaments may be brought selectively into a focused position in an optical system and is automatically energized when in such focused position to avoid interruption in the use of the optical system.

3. A lamp mounting for a lamp of the multiple filament type comprising, in combination, an apertured frame member, a lamp socket, means including an over-center toggle for pivotally mounting the socket on one side of the frame member, the lamp extending from the socket through the apertured frame member to occupy space on the other side of the frame member, a handle operatively connected to the lamp and which also extends through the apertured frame member to occupy space on said other side of the frame member, and stops for so limiting pivotal movement of the socket between two positions that movement of the socket from one of said positions into the other moves one of the filaments into substantially the same position previously occupied by the other filament, the socket being pivoted by means of finger pressure on the handle into either one of the two positions.

4. A lamp mounting according to claim 3 wherein the over-center toggle comprises a leaf spring that is clipped between a stationarily mounted anchor and the socket.

5. A lamp mounting according to claim 1 wherein the stops are adjustable.

6. A lamp mounting according to claim 2 wherein the socket is pivoted by finger pressure into either one of the two positions.

7. A lamp mounting according to claim 2 wherein the over-center toggle comprises a leaf spring that is clipped between a stationarily mounted anchor and the socket.

8. A lamp mounting according to claim 2 wherein the stops are adjustable.

References Cited in the file of this patent

UNITED STATES PATENTS

| | | |
|---|---|---|
| 1,088,094 | Richardson | Feb. 24, 1914 |
| 1,842,963 | Day | Jan. 26, 1932 |
| 2,118,997 | Zook | May 31, 1938 |
| 2,245,793 | Kurlander | June 17, 1941 |